US011580225B2

(12) United States Patent
Luciani, Jr. et al.

(10) Patent No.: US 11,580,225 B2
(45) Date of Patent: Feb. 14, 2023

(54) DETERMINE WHETHER TO PERFORM ACTION ON COMPUTING DEVICE BASED ON ANALYSIS OF ENDORSEMENT INFORMATION OF A SECURITY CO-PROCESSOR

(71) Applicant: HEWLETT PACKARD ENTERPRISE DEVELOPMENT LP, Spring, TX (US)

(72) Inventors: Luis E. Luciani, Jr., Tomball, TX (US); Darrell R. Haskell, Pagosa Springs, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 380 days.

(21) Appl. No.: 16/775,823

(22) Filed: Jan. 29, 2020

(65) Prior Publication Data
US 2021/0232688 A1 Jul. 29, 2021

(51) Int. Cl.
G06F 21/57 (2013.01)
G06F 21/12 (2013.01)
G06F 9/38 (2018.01)
G06F 9/4401 (2018.01)
G06F 1/3206 (2019.01)

(52) U.S. Cl.
CPC ............ G06F 21/57 (2013.01); G06F 1/3206 (2013.01); G06F 9/3877 (2013.01); G06F 9/4401 (2013.01); G06F 21/121 (2013.01)

(58) Field of Classification Search
CPC ...... G06F 21/57; G06F 1/3206; G06F 9/3877; G06F 9/4401; G06F 21/121; G06F 21/73; G06F 21/81
See application file for complete search history.

(56) References Cited

U.S. PATENT DOCUMENTS

| | | | |
|---|---|---|---|
| 9,189,378 B1 * | 11/2015 | Ryan | G06F 11/3668 |
| 9,218,462 B2 | 12/2015 | Ayvaz et al. | |
| 9,384,367 B2 | 7/2016 | Swanson et al. | |
| 9,690,401 B2 * | 6/2017 | Herbert | G06F 3/038 |
| 9,692,599 B1 * | 6/2017 | Krahn | H04L 9/3247 |
| 10,038,591 B1 * | 7/2018 | Kanakarajan | H04L 41/28 |
| 10,243,739 B1 * | 3/2019 | Brandwine | H04L 9/0643 |
| 2005/0283601 A1 | 12/2005 | Tahan | |
| 2008/0126779 A1 | 5/2008 | Smith | |

(Continued)

Primary Examiner — Abu S Sholeman
(74) Attorney, Agent, or Firm — Hewlett Packard Enterprise Patent Department

(57) ABSTRACT

Examples disclosed herein relate to a computing device that includes a central processing unit, a management controller separate from the central processing unit, and a security co-processor. The management controller is powered using an auxiliary power rail that provides power to the management controller while the computing device is in an auxiliary power state. The security co-processor includes device unique data. The management controller receives the device unique data and stores a representation at a secure location. At a later time, the management controller receives endorsement information from an expected location of the security co-processor. The management controller determines whether to perform an action on the computing device based on an analysis of the endorsement information and the stored representation of the device unique data.

20 Claims, 4 Drawing Sheets

(56) References Cited

U.S. PATENT DOCUMENTS

| | | | | |
|---|---|---|---|---|
| 2010/0332499 A1* | 12/2010 | Pan | ................... | G06F 16/24578 707/769 |
| 2016/0065589 A1* | 3/2016 | Leighton | ............... | H04L 63/123 726/4 |
| 2018/0188986 A1* | 7/2018 | Webster | .................. | G06F 21/51 |
| 2018/0330093 A1 | 11/2018 | Shivanna et al. | | |

* cited by examiner

DETERMINE WHETHER TO PERFORM ACTION ON COMPUTING DEVICE BASED ON ANALYSIS OF ENDORSEMENT INFORMATION OF A SECURITY CO-PROCESSOR

BACKGROUND

Service providers and manufacturers are challenged to deliver quality and value to consumers, for example by providing a secure computing system. A data center is a facility used to house computer networks, computer systems, and associated components, such as telecommunications and storage systems. Equipment in a data center may be in the form of servers mounted in rack cabinets.

BRIEF DESCRIPTION OF THE DRAWINGS

The following detailed description references the drawings, wherein.

Figure 1:
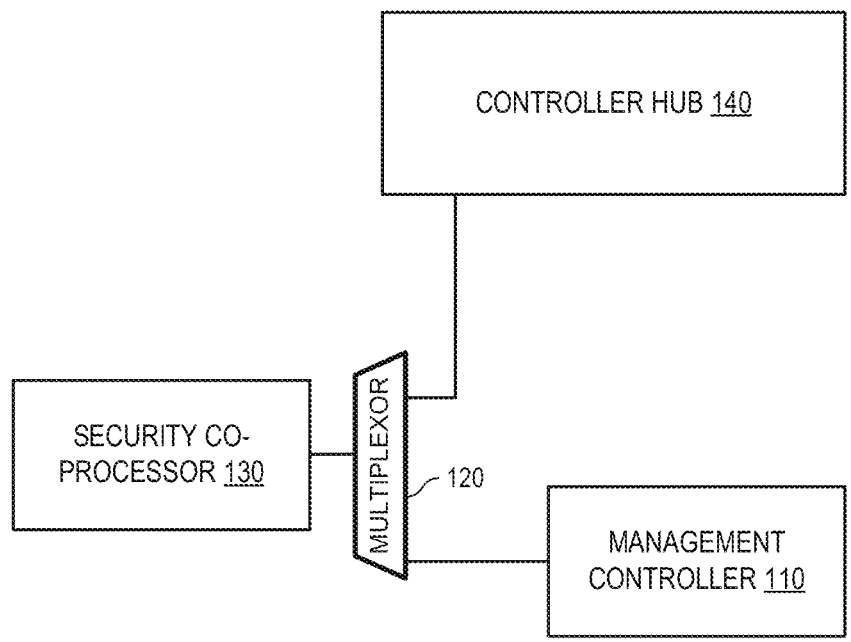
FIGS. 1 and 2 are block diagrams of computing devices, according to various examples.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

To provide reliable operation of a platform for an end-user, a platform manufacturer needs to enable the end-user to verify the authenticity of the platform. An authentication module or security co-processor consistent with the Trusted Platform Module (TPM) criteria conceived by Trusted Computing Group is an example security solution to detect authenticity of a platform. The TPM may be used to detect if a device of the platform is counterfeit, e.g., made by an unauthorized party or made in an unauthorized manner. The TPM may be used to authenticate each device of the platform, e.g., to check that the device is made by an authorized party in an authorized manner. During manufacturing of a device, the device manufacturer may instantiate a signed manufacturer identity in the device. The signed information is stored in the TPM. Later on, the signed information may be retrieved from the TPM to verify the authenticity of the device by checking the validity of the manufacturer identity. The TPM may be implemented as a security co-processor chip that conforms with Trusted Computing Group specifications.

In some examples, the security co-processor (e.g., a TPM) may include device unique data such as a private endorsement key. In some examples, a private endorsement key is a cryptographic key that is not visible outside of the security co-processor. The security co-processor can use the endorsement key for encryption purposes. Possession of a private endorsement key can be proved indirectly by using it to decrypt a value that has been encrypted with a public endorsement key. In some examples, a public endorsement key can be provided by the security co-processor as public certificate. In some examples, the public endorsement key and/or public certificate can be considered device unique data that is unique to the security co-processor. Further, in some examples, the public certificate can be a platform certificate that attests that a specific platform includes a unique security co-processor and certain platform configuration elements.

However, a potential attack vector to the security co-processor being used to protect a computing device is to replace the security co-processor with one populated with known information to an attacker. To protect from such an attack vector, examples disclosed herein relate to a management controller to request and receive device unique data (e.g., a public certificate) from the security co-processor at a first time (e.g., during manufacturing or provisioning) and performing an action at a later time in response to usage of the device unique data. In one example, at a later time, the management controller can determine whether the computing device is to boot up in response to an analysis of an installed security co-processor using the unique data. Accordingly, in some examples, on each boot, the management controller can determine whether to boot up based on the device unique data received from the security co-processor.

In some examples, a TPM is a security co-processor with which one can only interact through an Input/Output (I/O) buffer that uses a well-defined formatting. The TPM behavior is exclusively based on the (series of) command(s) it receives. Thus any guarantee one can get from the TPM is based on the commands issued. Prototypical examples are the measured boot and remote attestation mechanisms, which are built over the use of the TPM Platform Configuration Registers to remotely verify the state of a platform. PCRs are updated by hashing their previous value with the information to store. In the measured boot case, PCRs are used to store firmware and software integrity value. Using PCRs prevents removal of firmware or software execution events. In the examples described herein, a firmware or software component cannot erase its measurement event from the PCRs. Further, a manufacturer can predict expected PCR value for a device or platform because the manufacturer would know what firmware or software should be executed. As used herein, firmware can include multiple components that can be programmed, for example a field programmable gate array bitstream, a Serial Peripheral Interface (SPI) flash, an electronically erasable programmable read only memory (EEPROM), etc. in the platform. Unused programmable logic can also be measured (and can be a known value, for example 0 or a repeating pattern).

Figure 2:
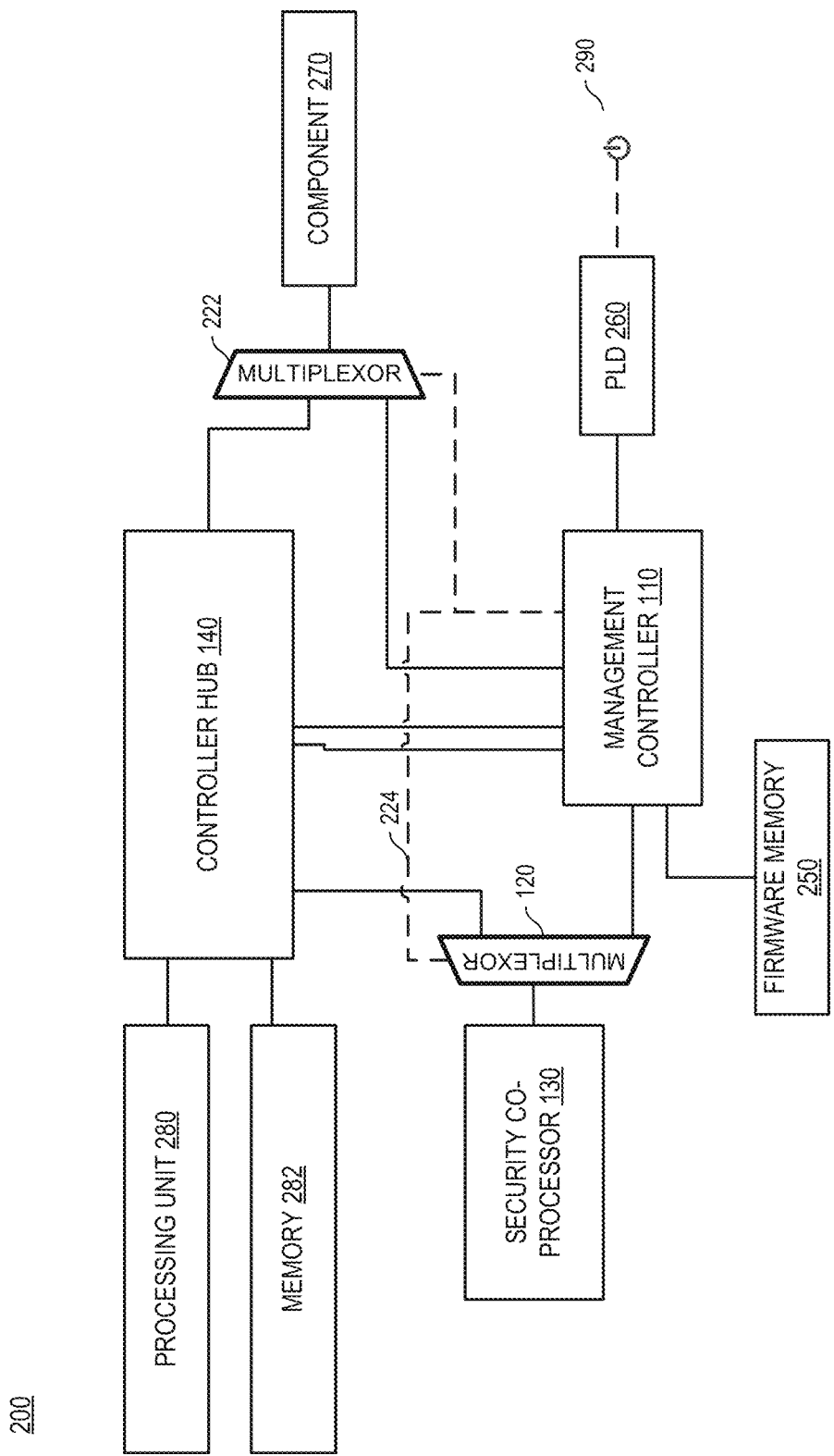

FIGS. 1 and 2 are block diagrams of computing devices, according to various examples. Referring now to the drawings, FIGS. 1 and 2 are block diagrams of computing devices capable of performing an action based on an analysis of endorsement information of a security co-processor. Systems 100, 200 can include a device that includes components that can be utilized to ensure that a security co-processor that is installed at manufacturing is the security co-processor that is used during boot of the computing device.

FIG. 1 includes a management controller 110 that is connected, via a multiplexor 120 to a security co-processor 130. The security co-processor 130 can also be connected to a controller hub 140 via the multiplexor 120.

FIG. 2 further includes another multiplexor 222 to enable the management controller 110 to communicate with a multiple component 270, firmware memory 250, a programmable logic device (PLD) 260, a processing unit 280, memory 282, and a power control 290.

In some examples, the management controller 110 can be used to implement services for the computing system 100, 200. Management controller 110 can be implemented using a separate processor from the processing unit 280 that is used to execute a high level operating system. Management controllers such as baseboard management controllers (BMCs) can provide so-called "lights-out" functionality for computing devices. The lights out functionality may allow a user, such as a systems administrator, to perform management operations on the computing system 100, 200 even if an operating system is not installed or not functional on the computing device. Moreover, in one example, the management controller 110 can run on auxiliary power, thus the computing system 100, 200 need not be powered on to an on state where control of the computing system 100, 200 is handed over to an operating system after boot. As examples, the management controller 110 may provide so-called "out-of-band" services, such as remote console access, remote reboot and power management functionality, monitoring health of the system, access to system logs, and the like. As used herein, a management controller 110 has management capabilities for sub-systems of a management controller 110, and is separate from a processor or processing element that executes a main operating system of a computing device (e.g., a server or set of servers).

As noted, in some instances, the management controller 110 may enable lights-out management of the computing system 100, 200, which provides remote management access (e.g., system console access) regardless of whether the computing system 100, 200 is powered on, whether a primary network subsystem hardware is functioning, or whether an OS is operating or even installed. The management controller 110 may comprise an interface, such as a network interface, and/or serial interface that an administrator can use to remotely communicate with the management controller 110. As used herein, an "out-of-band" service is a service provided by the management controller 110 via a dedicated management channel (e.g., the network interface or serial interface) and is available whether the computing system 100, 200 is in powered on state.

In some examples, a management controller 110 may be included as part of an enclosure. In other examples, a management controller 110 may be included in one or more of the servers (e.g., as part of the management subsystem of the server) or connected via an interface (e.g., a peripheral interface). In some examples, sensors associated with the management controller 110 can measure internal physical variables such as humidity, temperature, power supply voltage, communications parameters, fan speeds, operating system functions, or the like. The management controller 110 may also be capable to reboot or power cycle the device. As noted, the management controller 110 allows for remote management of the device, as such, notifications can be made to a centralized station using the management controller 110 and passwords or other user entry can be implemented via the management controller 110.

A firmware engine can be implemented using instructions executable by a processor and/or logic. In some examples, the firmware engine can be implemented as platform firmware. Platform firmware may include an interface such as a basic input/output system (BIOS) or unified extensible firmware interface (UEFI) to allow it to be interfaced with. The platform firmware can be located at an address space where the processing unit 280 (e.g., CPU) for the computing system 100, 200 boots. In some examples, the platform firmware may be responsible for a power on self-test for the computing system 100, 200. In other examples, the platform firmware can be responsible for the boot process and what, if any, operating system to load onto the computing system 100, 200. Further, the platform firmware may be capable to initialize various components of the computing system 100, 200 such as peripherals, memory devices 282, memory controller settings, storage controller settings, bus speeds, video card information, etc. In some examples, platform firmware can also be capable to perform various low level functionality while the computing system 100, 200 executes. Moreover, in some examples, platform firmware may be capable to communicate with a higher level operating system executing on a CPU, for example via an advanced configuration and power interface (ACPI). The firmware may be stored in a firmware memory 250. In some examples, the management controller 110 can perform validation on itself, the security co-processor, component, firmware memory, etc.

One or more the components, engines, memory, and controllers can be implemented using an application specific integrated circuit (ASIC). Examples of ASICs include controllers, programmable logic devices 260 such as field programmable gate arrays (FPGAs), complex programmable logic devices (CPLD), etc.

As used herein, a "Root of Trust device" or RoT device may be a device that behaves in an expected manner, as the RoT devices misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values. For example, the RoT may be a TPM. In such examples, the TPM may include a PCR (or a plurality of PCRs). Further, the RTS may be a PCR (or a plurality of PCRs). In another example, the RoT may include a Root of Trust for Reporting (RTR). The RTR may be a compute engine capable of sending requested information to a requesting device. The information may include the contents in a register of the RoT (or the contents of the RTS) and information specified by the requester. The RoT may include other compute engines not described here, such as a compute engine to measure specified values or a compute engine to authenticate.

As used herein, a "trusted platform module" or "TPM" may be an integrated circuit built into or otherwise coupled to a motherboard of a computing system. The TPM may be tamper resistant or tamper proof. The TPM may be utilized for services on the computing system. The services may include device identification, authentication, encryption, measurement, determine device integrity, secure generation of cryptographic keys, remote attestation, and sealed storage. The TPM may include platform configuration registers (PCRs). The PCRs may store security relevant metrics.

In one example, the management controller 110 may be associated with a secure storage, a hardware root of trust, or other security features. In one example, on initial boot of the computing system 100, 200 into a service operating system (OS) or provisioning engine in a factory, a unique private and public key are generated and 'glued' onto the system by being saved into the management controller storage. This storage can be persistent and not replaceable. The management controller 110 may allow indirect access to a key using an application programming interface. The values can be written to a write once register on a same Application Specific Integrated Circuit (ASIC) as the management controller 110. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the management controller 110 can be used to ensure that firmware of the computing system 100, 200 is secure (e.g., by ensuring that firmware is not updated unless it is signed or encrypted using a public key that the private key of the management controller 110 can verify or decrypt. Further, in some examples, the management controller 110 can stop the computing system 100, 200 from booting with compromised firmware.

Moreover, in some examples, the management controller 110 can further include a key repository. As used herein, a key repository is a storage that includes at least one private key that can be used to verify that information has been signed by a public key. In some examples, the public key can also be included in the key repository. In some examples, a private key that is part of a root of trust can be considered a part of a key repository. Further, in some examples, the device unique data can be stored in the key repository.

A system board is the main printed circuit board used for the system 100, 200 and allows communication between many of the components of the device, for example, the processing unit 280, the memory 282, peripherals, bus devices, etc. In some examples, a controller hub 140 can be an I/O controller hub, for example a southbridge. The controller hub 140 may be used to manage data communications between a CPU and other components of the system board. In some examples, a controller hub may have direct media interface to a northbridge device or the CPU. Further the controller hub 140 may provide peripheral support for the device, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc.

A processor, such as a central processing unit (CPU) 280 or a microprocessor suitable for retrieval and execution of instructions and/or electronic circuits can be configured to execute instructions. In certain scenarios, instructions and/or other information, such as operating system instructions and data, can be included in memory 282 or other memory. Input/output interfaces may additionally be provided by the computing system 100, 200. For example, input devices, such as a keyboard, a sensor, a touch interface, a mouse, a microphone, etc. can be utilized to receive input from an environment surrounding the computing system. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces.

As noted above, the management controller 110 can be separate from the processing unit 280. Further, the management controller 110 may include a root of trust as described above. In one example, the management controller 110 is powered by an auxiliary power rail. The auxiliary power rail may be used to power other components as well, for example, a PLD 260, multiplexors 120, 222, etc. The security co-processor 130 can include device unique data as described above.

In one example, at a first time, for example, manufacturing of the computing system 100, 200, a provisioning stage, etc., the management controller 110 can receive the device unique data and store a representation of the device unique data in a secure location. Reception of the device unique data can be in response to a request from the management controller. The secure storage can be a trusted area of the management controller 110. In some examples, the secure storage cannot be overwritten. In one example, the secure storage may include write once registers.

In one example, the device unique data includes a public endorsement key or public certificate for the security co-processor. Each unit that is manufactured can have a different private key and public key. The public key or a public certificate can thus be considered device unique data for the security co-processor. As noted above, the data should be unique to the security co-processor. A representation of the device unique data can be stored in a storage, for example a secure storage associated with the management controller 110. In one example, the representation is the device unique data that is received from the security co-processor. In another example, the representation is a hash (e.g., MD5, SHA, etc.) of the device unique data, a partial hash of a part of the device unique data, copy of a portion of the device unique data, another representation of the device unique data, or a combination thereof.

Similarly, the management controller 110 can measure code, settings, etc. from other components, such as code from itself, a PLD, other components, firmware, etc. The measurement can be later used to validate that the expected values are present the locations measured.

At a later point (e.g., when the computing system is at a customer location), the management controller 110 can begin a validation sequence. The management controller 110 can be protected by a root of trust. The validation sequence can begin with the management controller 110 validating that its startup code is valid (e.g., by measuring the startup code and comparing the measurement to a previously taken value). The startup code can then measure additional portions of the code to run on the management controller 110. In one example, once the management controller 110 validates its code, it can then chain to validate other firmware. For example, the management controller 110 can validate firmware via one or more measurement of firmware memory 250, a PLD 260, the security co-processor 130, another component 270 (e.g., an innovation engine or management engine), etc.

As shown in FIG. 2, the security co-processor 130 can be coupled via a bus to the controller hub 140 or the management controller 110 controlled using the multiplexor 120. The bus can be a serial bus, for example, a serial peripheral interface (SPI) bus, an 120 bus, a Controller Area Network (CAN) bus, etc. With this configuration, the security co-processor 130 can actively work with the system's controller hub 140, but still be validated by the management controller.

In one example, the validation sequence includes the management controller 110 controlling multiplexor 120 using a control signal 224 to select that the security co-processor 130 communicate with the management controller 110. The management controller 110 can then communicate with the security co-processor 130. In one example, the security co-processor 130 can boot up once powered by the auxiliary power. Moreover, in some examples, the security co-processor 130 can have a shorter boot time than the management controller 110.

In one example, the management controller 110 can issue a startup command to the security co-processor 130. In some examples, the startup command does not transfer ownership of the security co-processor 130 to the management controller 110.

The management controller 110 can then request and receive endorsement information. The endorsement information can be from an expected location of the security co-processor 130. For example, the request can be sent via a bus that the security co-processor 130 is expected to be at. If a different security co-processor is located at the location than the expected or original security co-processor, an action can be taken.

The security co-processor that is populated can provide the endorsement information to management controller 110. The management controller 110 can perform an action on the computing system 100, 200 based on an analysis of the endorsement information and the stored representation of the device unique data.

In one example, the endorsement information is a key or certificate and the device unique data is a corresponding key or certificate. A comparison can be performed to validate that the two match.

In another example, the endorsement information is a key or certificate that includes the device unique data and the representation is a hash of the device unique data. The endorsement information can be hashed and compared to validate that the security co-processor has not been tampered with or replaced.

In a further example, the endorsement information can be in the form of a response to an interrogation request from the management controller 110. For example, the management controller 110 can provide data that the security co-processor 130 is to encrypt or sign using a private key. The device unique data can include information that will allow the management controller 110 to decrypt the data or validate the signature. A nonce can be used in this exchange. Accordingly, the endorsement information can include an answer that is an expected answer to the interrogation. The validation can be based on the expected answer.

In one example, the management controller 110 can determine whether to perform an action based on the analysis of the endorsement information. In the example where the endorsement information is validated using the device unique data, the management controller 110 can continue the validation sequence. In some examples, the validation sequence is part of a boot event. Thus, in one example, the action can include enabling power on of the computing system 100, 200 (e.g., by enabling a power control signal 290 directly or indirectly (e.g., using PLD 260)). As noted, further validations can occur prior to the power control signal being activated. Other actions that can be taken include logging the event and sending a message about the event.

In another example, the endorsement information can be received from a second security co-processor that replaced the original. In this scenario, the endorsement information is not validated and an action can be performed. In one example, the event can be logged. In another example, a message can be sent to an administrator. In a further example, the management controller 110 can prevent boot of the computing system 100, 200. This can be implemented directly by controlling a power signal 290 or via intermediaries (e.g., by using PLD 260).

In an example where the management controller 110 validates the endorsement information, the management controller 110 can select the multiplexor 120 to select the controller hub 140 to communicate with the security co-processor 130. This can be after the portion of the validation sequence related to the security co-processor. In some examples, during a boot process, ownership of the security co-processor 130 can be taken by a host device using the controller hub 140.

In some examples, the validation sequence can also include validation other components, for example component 270, firmware memory 250, and/or PLD 260. In one example, multiplexor 222 can be used to change a bus from communicating with the management controller 110 or the controller hub 140. This can be controlled by a signal from the management controller 110, for example, signal 224 or a separate signal. The management controller 110 can validate a firmware image of the other component as another part of the validation sequence. Various approaches can be used for validating the component, for example, keeping a hash of an expected firmware image, partial image, and/or settings and taking a new hash of the current firmware image, partial image, and/or settings of the component 270. The hashes can be compared. In one example, validating the firmware image of the component 270 is part of the validation sequence and an action (e.g., enable/prevent boot) can be taken in response to the result of the validation. In examples where a multiplexor is used, the control signal can change the path to a production mode path, where the component is to communicate with another component (e.g., the controller hub 140) during normal operation of the computing system 100, 200.

With the approaches described herein, the management controller 110 can securely start up the computing system 100, 200. The management controller can validate its initial startup code using a root of trust approach as described above. Then a firmware image of a remaining portion of the management controller 110 can be validated using a root of trust. Further, components, such as the PLD 260 and component 270 can be validated. Further, a boot firmware can be stored in firmware memory 250. The boot firmware can include, for example, a platform firmware image such as a basic input output system or a unified extensible firmware interface image. The boot firmware can be validated as part of a startup sequence. In some examples, each component is validated prior to enabling power to the computing system 100, 200.

One or more components of a computing system can be implemented using an engine. An engine can include hardware and/or combinations of hardware and programming to perform functions described herein. Moreover, functionality attributed to a particular engine may also be implemented using another engine or a combination of engines.

In some examples, a processing element, for example, processing unit 280, may be, one or multiple processing unit (e.g., a central processing unit (CPU)), one or multiple semiconductor-based microprocessor, one or multiple graphics processing unit (GPU), other hardware devices suitable for retrieval and execution of instructions stored in a machine-readable storage medium, or combinations thereof. The processing element can be a physical device. Moreover, in one example, the processing element may include multiple cores on a chip, include multiple cores across multiple chips, multiple cores across multiple devices, or combinations thereof. A processing element may fetch, decode, and execute instructions to implement tasks, for example, running an operating system, providing server capabilities, executing containers or virtual machines, etc. As an alternative or in addition to retrieving and executing instructions, processing element may include at least one integrated circuit (IC), other control logic, other electronic circuits, or combinations thereof that include a number of electronic components for performing the functionality of various instructions.

A machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, a machine-readable storage medium may be encoded with a series of executable instructions for running a computing system.

In the computing system, the management controller 110 can be part of a management subsystem while the processing unit 280 is part of a production or host subsystem. Portions of the host subsystem may be turned on in response to validation performed by the management controller 110.

Figure 3:
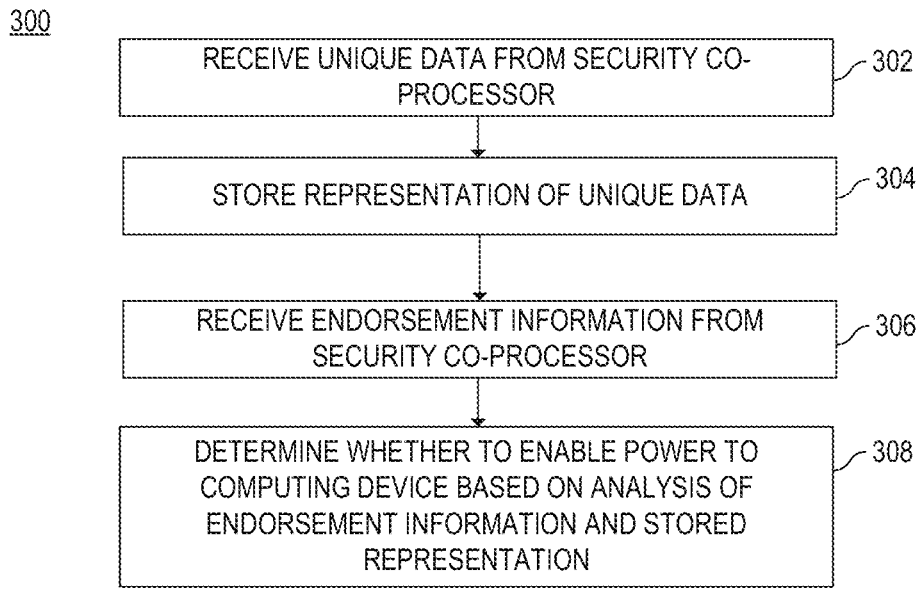
FIG. 3 is a flowchart of a method for performing an action based on an analysis of endorsement information and a stored representation of device unique data unique to a security co-processor, according to an example.
Figure 4:
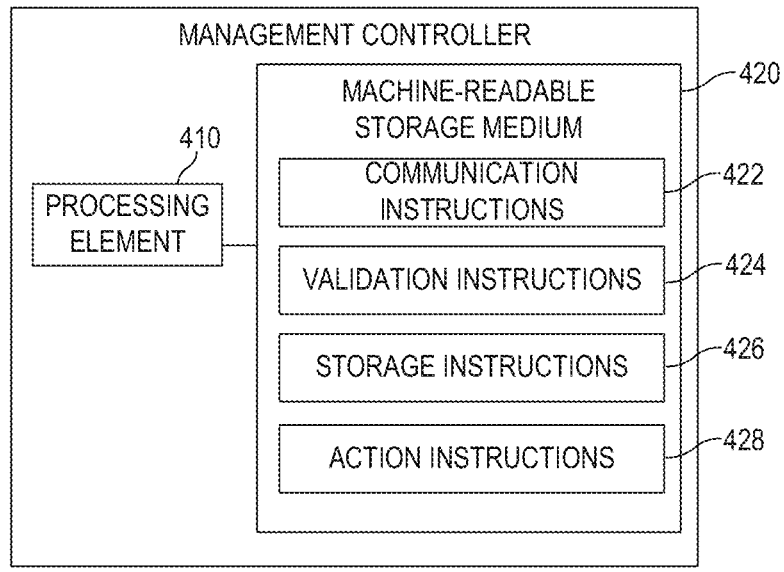
FIG. 4 is a block diagram of a management controller capable to perform an action based on an analysis of endorsement information and a stored representation of device unique data unique to a security co-processor, according to an example.

FIG. 3 is a flowchart of a method for performing an action based on an analysis of endorsement information and a stored representation of device unique data unique to a security co-processor, according to an example. FIG. 4 is a block diagram of a management controller capable to perform an action based on an analysis of endorsement information and a stored representation of device unique data unique to a security co-processor, according to an example.

Processing element 410 may be, one or multiple processing units, one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Processing element 410 may fetch, decode, and execute instructions 422, 424, 426 to implement determine whether to enable power to a computing device based on an analysis of endorsement information. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for performing an action in response to an analysis of endorsement information and a stored representation of device unique data unique to a security co-processor.

Management controller 400 can be implemented within as part of a computing device or computing system, for examples systems 100, 200. The computing device can include the management controller 400, a security co-processor, and at least one central processing unit that is separate from the management controller 400. In some examples, the management controller is powered using an auxiliary power rail that provides power to the management controller 400 while the computing device is in an auxiliary power state. As used herein "an auxiliary power state" is a state where power is not supplied to the CPU, but is supplied to a number of components (e.g., the management controller 400). In some examples, the auxiliary power state can be the Advanced Configuration and Power Interface (ACPI) S5 state. The auxiliary power state allows avoidance of contention between the management processor and another software, such as a platform firmware (e.g., UEFI), executing on the system.

Although execution of method 300 is described below with reference to management controller 400, other suitable components for execution of method 300 can be utilized (e.g., management controller 110). Additionally, the components for executing the method 300 may be spread among multiple devices. Method 300 may be implemented in the form of executable instructions stored on a machine-readable storage medium, such as storage medium 420, and/or in the form of electronic circuitry.

At 302 of method 300, the management controller 400 can execute communication instructions 422 to receive unique data from a security co-processor. As noted earlier, this can be during a manufacturing or provisioning state of the computing device, or similar security snapshot state. The management controller 400 can receive the device unique data and store a representation of the device unique data in a secure location by executing storage instructions 426 (304). Reception of the device unique data can be in response to a request from the management controller 400. The secure storage can be a trusted area of the management controller 400. In some examples, the secure storage cannot be overwritten. In one example, the secure storage may include write once registers.

As noted above, the device unique data includes a public endorsement key or public certificate for the security co-processor. As noted, in some examples, each unit that is manufactured can have a different private key and public key. The public key or a public certificate can thus be considered device unique data for the security co-processor. Thus, the data should be unique to the security co-processor. A representation of the device unique data can be stored in a storage, for example a secure storage associated with the management controller 400. In one example, the representation is the device unique data that is received from the security co-processor. In another example, the representation is a hash (e.g., MD5, SHA, etc.) of the device unique data, a partial hash of a part of the device unique data, copy of a portion of the device unique data, another representation of the device unique data, or a combination thereof.

Similarly, the management controller 400 can measure code, settings, etc. from other components, such as code from itself, a PLD, other components, firmware, etc. The measurement can be later used to validate that the expected values are present the locations measured.

At a later point (e.g., when the computing device is at a customer location), the management controller 400 can begin a validation sequence. The management controller 400 can be protected by a root of trust. The validation sequence can begin with the management controller 400 validating that its startup code is valid (e.g., by measuring the startup code and comparing the measurement to a previously taken value). The startup code can then measure additional portions of the code to run on the management controller 400. In one example, once the management controller 400 validates its code, it can then chain to validate other firmware. For example, the management controller 400 can validate firmware via one or more measurement of firmware memory, a PLD, the security co-processor, another component (e.g., an innovation engine or management engine), etc.

In one example, the validation sequence includes the management controller 400 controlling a multiplexor using a control signal to select that the security co-processor communicate with the management controller 400. The management controller 400 can then communicate with the security co-processor.

In one example, the management controller 400 can issue a startup command to the security co-processor. In some examples, the startup command does not transfer ownership of the security co-processor to the management controller 400.

The management controller 400 can then request and receive endorsement information at 306. The endorsement information can be from an expected location of the security co-processor. For example, the request can be sent via a bus that the security co-processor is expected to be at. If a different security co-processor is located at the location than the expected or original security co-processor, an action can be taken.

The security co-processor that is populated can provide the endorsement information to management controller 400. The management controller 400 can execute validation instructions 424 using the processing element 410 to determine whether to perform an action on the computing device based on an analysis of the endorsement information and the stored representation of the device unique data. For example, the management controller can determine whether to enable power to the computing device based on the analysis (308). The processing element 410 can execute action instructions 428 to perform the action.

As noted above, in one example, the endorsement information is a key or certificate and the device unique data is a corresponding key or certificate. A comparison can be performed to validate that the two match.

In another example, the endorsement information is a key or certificate that includes the device unique data and the representation is a hash of the device unique data. The endorsement information can be hashed and compared to validate that the security co-processor has not been tampered with or replaced.

In a further example, the endorsement information can be in the form of a response to an interrogation request from the management controller 400. For example, the management controller 400 can provide data that the security co-processor is to encrypt or sign using a private key. The device unique data can include information that will allow the management controller 400 to decrypt the data or validate the signature. A nonce can be used in this exchange. Accordingly, the endorsement information can include an answer that is an expected answer to the interrogation. The validation can be based on the expected answer.

In one example, the management controller 400 can determine whether to perform an action based on the analysis of the endorsement information. In the example where the endorsement information is validated using the device unique data, the management controller 400 can continue the validation sequence. In some examples, the validation sequence is part of a boot event. Thus, in one example, the action can include enabling power on of the computing device (e.g., by enabling a power control signal directly or indirectly (e.g., using a PLD)). As noted, further validations can occur prior to the power control signal being activated. Other actions that can be taken include logging the event and sending a message about the event.

In another example, the endorsement information can be received from a second security co-processor that replaced the original. In this scenario, the endorsement information is not validated and an action can be performed. In one example, the event can be logged. In another example, a message can be sent to an administrator. In a further example, the management controller 400 can prevent boot of the computing device.

Figure 5:
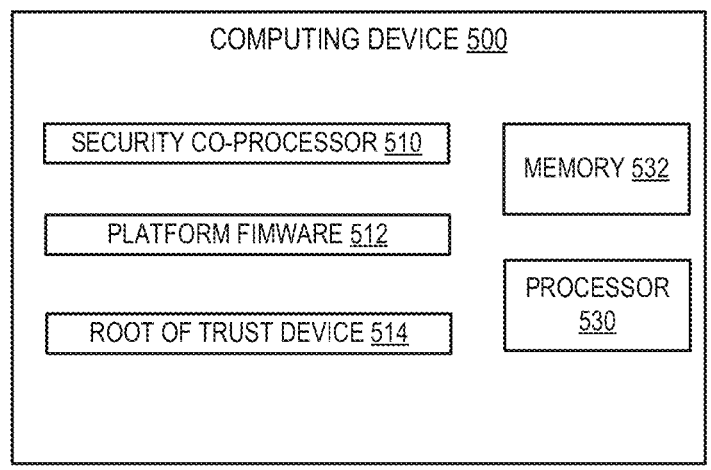
FIG. 5 is a block diagram of a computing device capable to perform an action based on an analysis of endorsement information and a stored representation of device unique data unique to a security co-processor, according to an example.

FIG. 5 is a block diagram of a computing device capable to perform an action based on an analysis of endorsement information and a stored representation of device unique data unique to a security co-processor, according to an example. The computing device 500 can include a security co-processor 510, platform firmware 512, a root of trust device 514, a processor 530, and memory 532.

In this example, the security co-processor 510 can be evaluated using platform firmware 512 executing on a processor 530 of the computing device 500. This can be performed in a manner similar to the approaches using management controllers 110, 400.

At a first time, the security co-processor 510 can be queried for device unique data. The query can come using a root of trust device 514 such as a management controller 110 or using another engine, such as platform firmware 512 executing on processor 530. The platform firmware 512 may be loaded to a memory 532 such as a main memory of the computing device 500. This can be stored in a secure storage (e.g., at another security co-processor, a secure storage device, etc.).

At a later time, when the computing device 500 is to boot in a production environment, the root of trust device 514 (e.g., a management controller with a root of trust) can measure its code as well as code of other components in a manner consistent to the manner described above. The other components can include a memory (e.g., a read only memory) including the platform firmware 512, other code, settings, PLD logic, etc. This can be prior to allowing power to boot the computing device 500.

Once power is applied, the platform firmware 512 can begin execution on the processor 530. As part of an initialization of the computing device 500 the platform firmware 512 can include a validation sequence for the security co-processor 530.

In one example, the validation sequence includes the processor 530 communicating with the security co-processor 130. In various examples, the security co-processor 130 can boot up once powered by the auxiliary power or using a power rail shared with the processor 530.

In one example, the platform firmware 512 be executed to issue a startup command to the security co-processor 510. In some examples, the startup command does not transfer ownership of the security co-processor 510.

The processor 530 can then request and receive endorsement information. The endorsement information can be from an expected location of the security co-processor 510. For example, the request can be sent via a bus that the security co-processor 510 is expected to be at. If a different security co-processor is located at the location than the expected or original security co-processor, an action can be taken.

The security co-processor that is populated can provide the endorsement information to the platform firmware 512 executing on the processor 530. The platform firmware 512 can be executed to perform an analysis of the endorsement information and the stored representation of the device unique data as described above in relation to the management controller.

If the security co-processor 510 is validated, the computing device 500 can continue its boot sequence and the execution of the computing device 500 can be turned over to a high level operating system. If the security co-processor 510 is not validated, another action can be taken, for example, logging, sending a security alert or message, stopping boot of the computing device 500, etc. Stopping boot of the computing device 500 may include removing power from the computing device 500, setting a flag in a PLD to cause the system not to boot up until cleared, not turning over control of the computing device 500 to the operating system, etc. Further, in some examples, the platform firmware 512 can be used to implement some of the activities of the management controller 400 related to the validation of the security co-processor.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
    a controller hub;
    a multiplexor;
    at least one central processing unit (CPU);
    a management controller separate from the at least one CPU, wherein the management controller is powered using an auxiliary power rail that provides power to the management controller while the computing device is in an auxiliary power state; and
    a security co-processor including a device unique data unique to the security co-processor, wherein the device unique data comprises a cryptographic key,
    wherein the management controller is to:
        at a first time, receive the device unique data comprising the cryptographic key and store a representation of the device unique data in a secure location;
        at a later time after the first time, as part of a validation sequence during a boot of the computing device:
            control, using a control signal, the multiplexor to connect the management controller to the security co-processor,
            receive, through the multiplexor, endorsement information from an expected location of the security co-processor,
            compare information based on the endorsement information to the representation of the device unique data comprising the cryptographic key, and
            determine whether to enable or prevent the boot of the computing device according to whether the information based on the endorsement information matches the representation of the device unique data comprising the cryptographic key; and
        after the validation sequence, control, using the control signal, the multiplexor in the computing device to connect the controller hub to the security co-processor.

2. The computing device of claim 1, wherein the management controller is to control the multiplexor after the validation sequence to connect the controller hub to the security co-processor in response to the information based on the endorsement information matching the representation of the device unique data comprising the cryptographic key, wherein the controller hub is to manage data communication between the CPU and other components of the computing device.

3. The computing device of claim 1, wherein the management controller is to:
    after controlling the multiplexor to connect the management controller to the security co-processor:
        send a startup command to the security co-processor, and
        after the sending of the startup command, send a request to the security co-processor for the endorsement information.

4. The computing device of claim 1, wherein the endorsement information comprises a cryptographic key.

5. The computing device of claim 1, wherein the representation of the device unique data is a hash of the device unique data.

6. The computing device of claim 1, wherein the management controller is to, as part of the validation sequence, validate program code of the management controller and a firmware image in a firmware memory.

7. The computing device of claim 1, wherein the management controller is to prevent the boot of the computing device in response to the information based on the endorsement information not matching the representation of the device unique data comprising the cryptographic key.

8. The computing device of claim 1, wherein the management controller is a baseboard management controller.

9. The computing device of claim 1, wherein the management controller is to perform the validation sequence again on a next boot of the computing device.

10. The computing device of claim 1, wherein the security co-processor is powered by the auxiliary power rail when the validation sequence is performed.

11. A non-transitory machine-readable storage medium comprising instructions that upon execution cause a management controller to:
receive, at a first time, a device unique data from a security co-processor that is unique to the security co-processor of a computing device that further comprises the management controller and a central processing unit (CPU) separate from the management controller, wherein the device unique data comprises a cryptographic key;
store a representation of the device unique data in a secure location,
wherein the management controller is powered using an auxiliary power rail that provides power to the management controller while the computing device is in an auxiliary power state;
at a later time after the first time and as part of a validation sequence during a boot of the computing device:
control, using a control signal, a multiplexor in the computing device to connect the management controller to the security co-processor,
receive, through the multiplexor, endorsement information from an expected location of the security co-processor;
compare information based on the endorsement information to the representation of the device unique data comprising the cryptographic key, and
determine whether to enable or prevent the boot of the computing device according to whether the information based on the endorsement information matches the representation of the device unique data comprising the cryptographic key; and
after the validation sequence, control, using the control signal, the multiplexor in the computing device to connect a controller hub of the computing device to the security co-processor.

12. The non-transitory machine-readable storage medium of claim 11, wherein the controller hub is to manage data communication between the CPU and other components of the computing device.

13. The non-transitory machine-readable storage medium of claim 12, further comprising instructions that when executed cause the management controller to:
control the multiplexor after the validation sequence to connect the controller hub to the security co-processor in response to the information based on the endorsement information matching the representation of the device unique data comprising the cryptographic key.

14. The non-transitory machine-readable storage medium of claim 11, further comprising instructions that when executed cause the management controller to:
after controlling the multiplexor to connect the management controller to the security co-processor:
send a startup command to the security co-processor, and
after the sending of the startup command, send a request to the security co-processor for the endorsement information.

15. The non-transitory machine-readable storage medium of claim 11, further comprising instructions that when executed cause the management controller to as part of the validation sequence, validate program code of the management controller and a firmware image in a firmware memory.

16. A method comprising:
receiving, by a management controller at a first time, a device unique data from a security co-processor that is unique to the security co-processor of a computing device that further comprises the management controller and a central processing unit (CPU) separate from the management controller, wherein the device unique data comprises a cryptographic key;
storing, by the management controller, a representation of the device unique data in a secure location,
wherein the management controller is powered using an auxiliary power rail that provides power to the management controller while the computing device is in an auxiliary power state;
at a later time after the first time and as part of a validation sequence during a boot of the computing device:
controlling, using a control signal, a multiplexor in the computing device to connect the security co-processor to the management controller;
receiving, by the management controller through the multiplexor, endorsement information from an expected location of the security co-processor;
comparing information based on the endorsement information to the representation of the device unique data comprising the cryptographic key, and
determining, by the management controller, whether to enable or prevent the boot of the computing device according to whether the information based on the endorsement information matches the representation of the device unique data comprising the cryptographic key; and
after the validation sequence, controlling, using the control signal, the multiplexor in the computing device to connect a controller hub of the computing device to the security co-processor.

17. The method of claim 16, wherein the management controller controls the multiplexor to connect the controller hub to the security co-processor in response to the information based on the endorsement information matching the representation of the device unique data comprising the cryptographic key.

18. The method of claim 16, further comprising:
after controlling the multiplexor to connect the management controller to the security co-processor:
sending, by the management controller, a startup command to the security co-processor, and
after the sending of the startup command, sending a request to the security co-processor for the endorsement information.

19. The method of claim 16, wherein the representation of the device unique data is a hash of the device unique data.

20. The method of claim 16, wherein the management controller is to prevent the boot of the computing device in response to the information based on the endorsement information not matching the representation of the device unique data comprising the cryptographic key.

* * * * *